United States Patent [19]

Cornell et al.

[11] 4,019,105
[45] Apr. 19, 1977

[54] CONTROLLED CURRENT INDUCTION MOTOR DRIVE

[75] Inventors: Edward P. Cornell; Thomas A. Lipo, both of Schenectady, N.Y.

[73] Assignee: General Electric Company, Schenectady, N.Y.

[22] Filed: Sept. 26, 1975

[21] Appl. No.: 617,187

[52] U.S. Cl. .............................. 318/227; 318/230; 318/231

[51] Int. Cl.² .......................................... H02R 5/40

[58] Field of Search ................. 318/227, 230, 231

[56] References Cited

UNITED STATES PATENTS

| | | | |
|---|---|---|---|
| 3,372,323 | 3/1968 | Guyeska | 318/231 X |
| 3,512,067 | 5/1970 | Landau | 318/227 |
| 3,593,083 | 7/1971 | Blaschke | 318/227 |
| 3,775,649 | 11/1973 | Bayer et al. | 318/227 X |
| 3,824,437 | 7/1974 | Blaschke | 318/227 |

*Primary Examiner*—Gene Z. Rubinson
*Attorney, Agent, or Firm*—Donald R. Campbell; Joseph T. Cohen; Jerome C. Squillaro

[57] ABSTRACT

Improved stable four-quadrant operation of an induction motor supplied with variable amplitude and frequency stator line current by a motor controller with a constant current source converter is achieved by using several feedback control loops to control the slip frequency as well as the stator line current amplitude and frequency. Speed feedback is employed with optional control of rotor speed. Motor performance is optimized by indirectly regulating air gap flux to its rated value by controlling slip frequency as a function of sensed stator current. Thus, torque is approximately linear with stator current.

11 Claims, 6 Drawing Figures

CONTROLLED CURRENT INDUCTION MOTOR DRIVE

BACKGROUND OF THE INVENTION

This invention relates to a motor control circuit for induction motors, and more particularly a motor control for a controlled current induction motor drive system capable of stable four quadrant operation.

It is well known that under certain operating conditions a conventional voltage and frequency controlled induction machine operating either as a motor or generator can exhibit self-sustaining oscillations about a steady-state operation point. These instabilities are not a result of load or disturbance torques but are directly related to the machine parameters and operating constraints. Similar stability problems occur in current and frequency controlled induction motor drives, and it is necessary to add feedback control loops to achieve all operating points. Motor control circuits for such controlled current drive systems use a current controlled inverter in which the output current waveshape and frequency are controlled rather than the output voltage and its frequency as in the usual inverter.

Controlled current induction motor drives with feedback controls for four-quadrant operation have been disclosed in the prior art, such as in the article entitled "Static Induction Motor Drive: An Ideal Drive for the Paper Industry" by Larry D. Beer, IEEE Conference Record of 1971 Annual Pulp and Paper Industry Technical Conference, Apr. 21–23, 1971; and also in U.S. Pat. Nos. 3,863,121 or 3,863,122 granted on Jan. 28, 1975 to Charles E. Rettig and both assigned to Litton Industrial Products, Inc. All three of these describe essentially the same motor control technique in which the speed error commands the actual value of slip frequency and slip frequency in turn regulates the commanded value of stator current. Additionally, tachometer feedback of the rotor speed is employed to constrain the inverter output or stator current frequency to be the sum of the commanded slip frequency and sensed rotor frequency. With such an arrangement, unstable operation can result when the rectifier voltage determining the stator current magnitude is constant and at its maximum, and no longer is able to respond to changes in the stator current command. The present invention is directed to an improved motor controller to obtain a more stable current controlled induction motor drive system capable of four quadrant operation under optimized rated flux conditions.

SUMMARY OF THE INVENTION

The improved induction motor control circuit for stable four-quadrant operation is comprised by a constant current source converter, such as a controlled rectifier coupled through a smoothing inductor to a controlled current inverter, for producing variable amplitude and frequency stator line current to be supplied to the stator winding. A suitable current sensor is provided for sensing the peak stator current amplitude and also a speed sensor for sensing the rotor speed and frequency and generating sensor signals representative thereof. First feedback control means derives a slip frequency signal as a predetermined function of the stator current sensor signal to maintain constant rated air gap magnetic flux. Second feedback control means sums the slip frequency signal and rotor frequency sensor signal to generate an electrical frequency control signal which determines the inverter operating frequency and thus the frequency of the stator line current produced by the converter. Third feedback control means sums a stator current amplitude command signal, which is representative of desired torque, and the stator current sensor signal to generate an error signal for determining the controlled rectifier output voltage and therefore the amplitude of the stator line current produced by the converter. In the first feedback control, a slip frequency regulator produces an absolute value signal whose polarity is inverted by a motoring-generating control only during generating to thereby derive the slip frequency signal. In the third feedback loop, an integral plus proportional type voltage regulator is desirably used to have rectifier voltage respond to stator current error.

In this closed loop control strategy, motor operation is stable and performance is optimized by indirectly regulating air gap flux to its rated value by controlling slip frequency as a function of stator current. Advantageously, torque is approximately linearly related to stator current. Instead of using stator current or torque as the unconstrained input, speed is used as the unconstrained input in another embodiment with an external feedback control loop in which a rotor speed command signal and the speed sensor signal are summed to derive the stator current amplitude command signal using an absolute value type proportional speed regulator. The polarity of the rotor speed error signal then determines motoring or generating operation.

DESCRIPTION OF THE PREFERRED EMBODIMENTS

Figure 1:
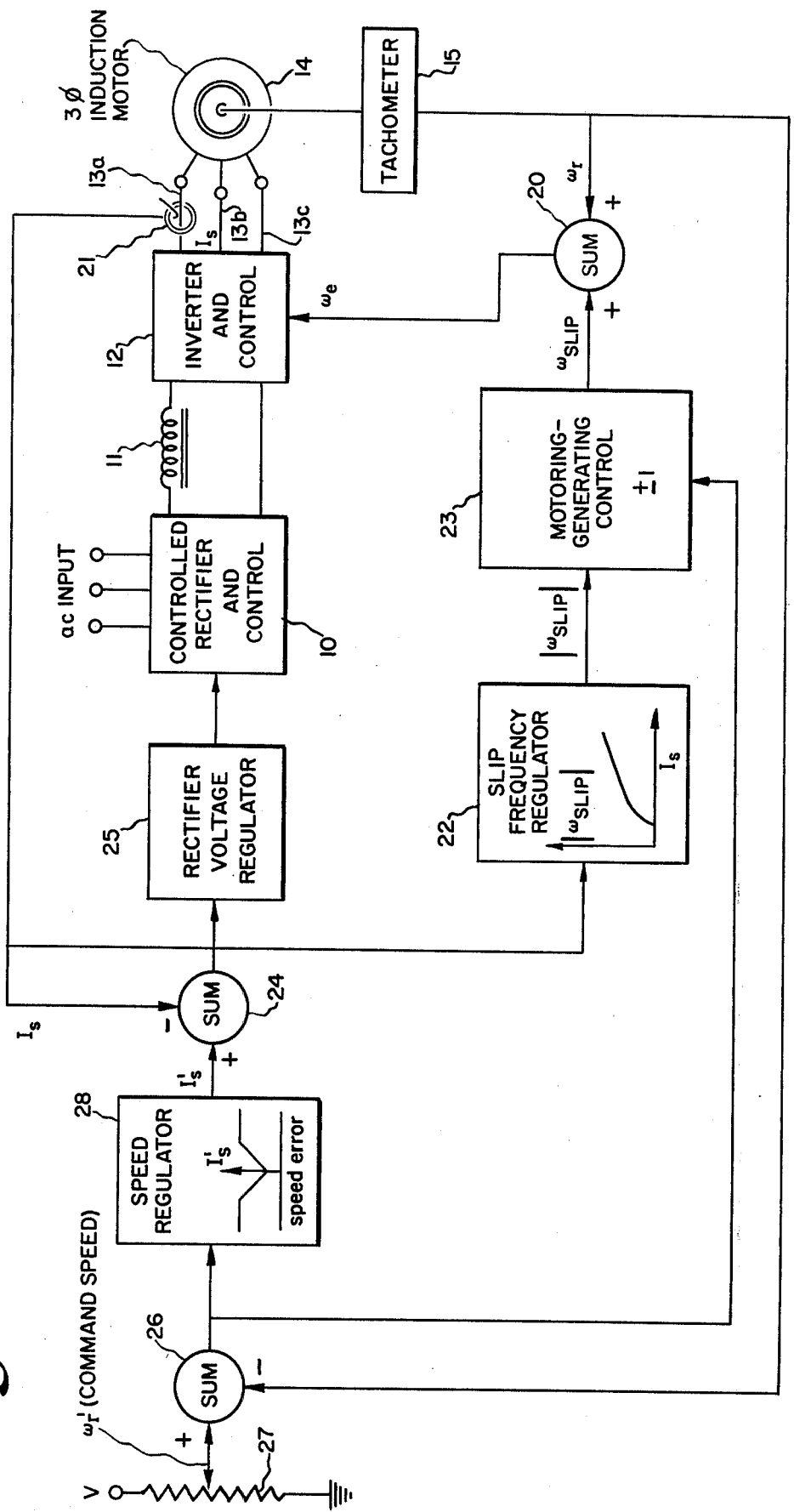
FIG. 1 is a schematic block diagram of one embodiment of a motor control for a current controlled induction motor drive with tachometer feedback as herein taught with provision for speed control.
Figure 2:
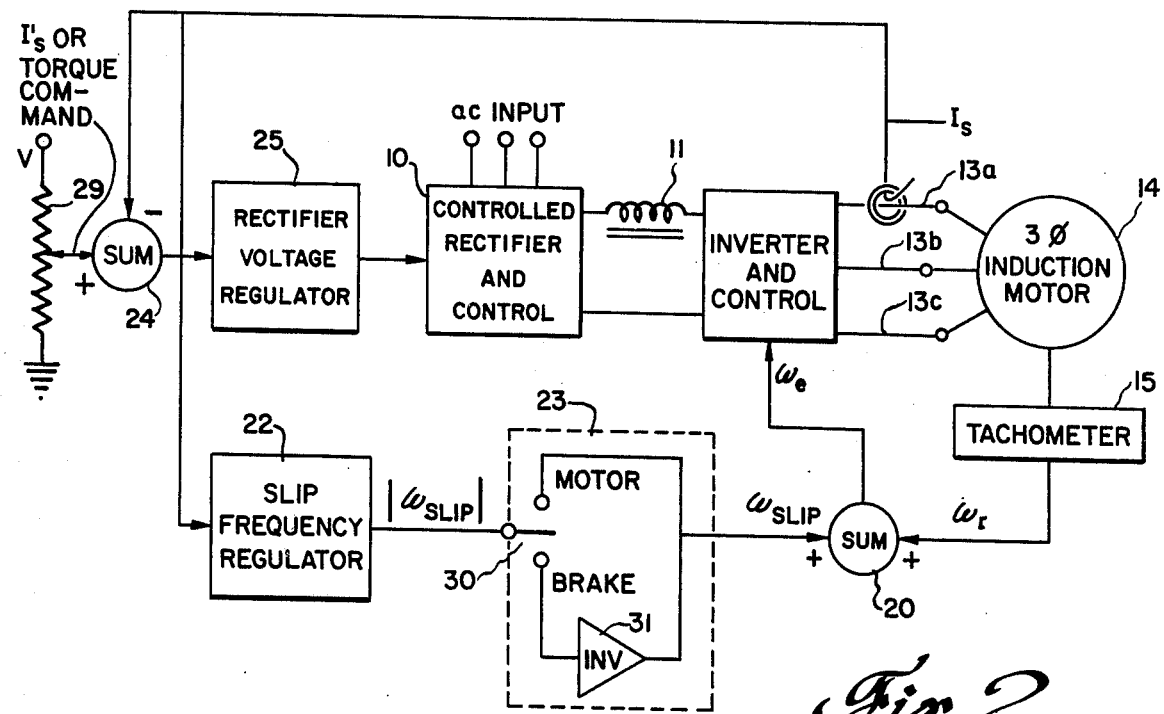
FIG. 2 is similar to FIG. 1 but without the external speed feedback control loop and provision for torque or stator current magnitude control.

The controlled current, adjustable speed ac induction motor drive with tachometer feedback shown in FIG. 1 has the capability of stable four quadrant operation, and is suitable for a variety of industrial applications including drives for pumps, fans, winches, hoists, conveyors, and other single motor applications. Whereas the rotor speed is the unconstrained input in FIG. 1, the second embodiment of the invention in FIG. 2 is identical except that the external speed control loop is removed, and has provision for torque or stator current amplitude as the unconstrained input so as to be particularly suitable for traction applications. The solid state power circuit (see FIG. 1) is a constant current source converter generally comprised by a controlled rectifier 10 coupled by a smoothing inductor or dc reactor 11 to a variable operating frequency controlled current inverter 12. As is evident, the magnitude of the constant, regulated dc current supplied to the inverter is adjusted by varying the rectifier dc output voltage. The three-phase current controlled inverter produces variable amplitude and frequency, rectangular wave output currents, hereafter referred to as the stator line currents $I_s$, that are fed to the stator supply lines 13a, 13b, and 13c. The three-phase induction motor 14 energized by the motor controller is a conventional motor with wye-connected stator windings, provided with a tachometer 15 or other rotor shaft speed sensor for generating a sensor signal indicative of the rotor mechanical speed. Although not here illustrated, a suitble transducer can be provided for deriving the rotor angular frequency $\omega_r$.

Figure 3:
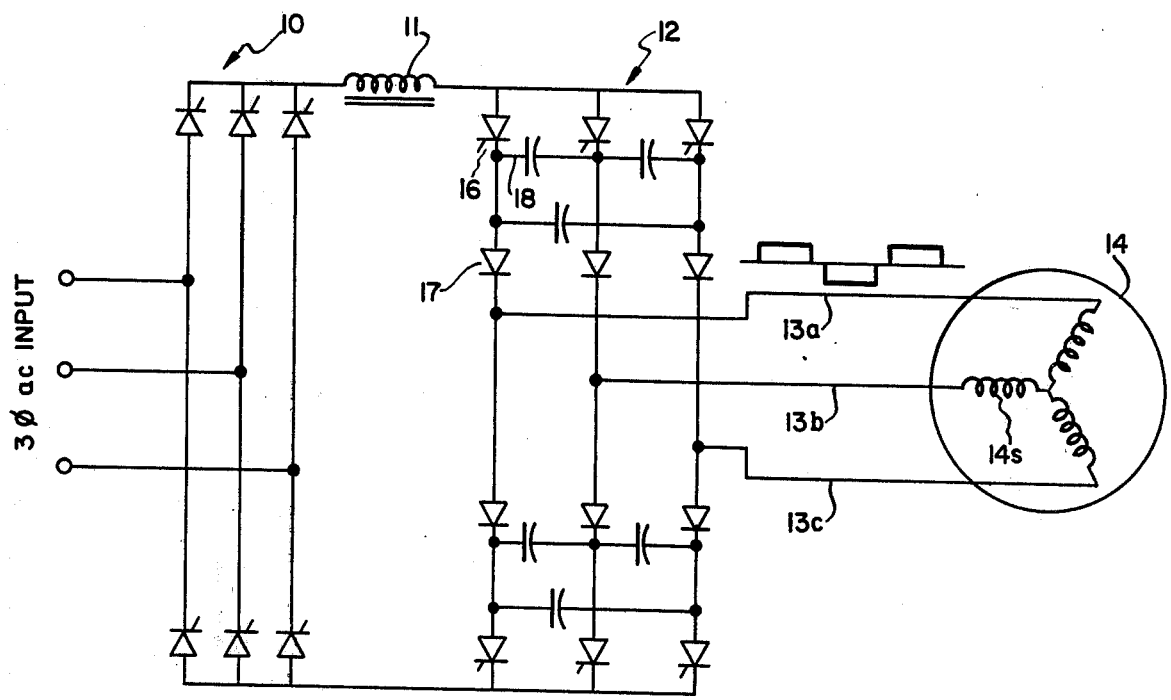
FIG. 3 is a schematic power circuit diagram for a suitable constant current source converter for producing variable frequency and variable amplitude stator line currents.

Referring to FIG. 3, the constant current source converter is preferably comprised by a three-phase, six-thyristor, phase controlled bridge rectifier 10, and a three-phase, six-thyristor, auto-sequential commutated current controlled inverter 12. In each of the six inverter legs is an SCR 16 and a series connected blocking diode 17, with three delta-connected commutating capacitors 18 provided between the intersections of each SCR and diode in the upper inverter section for producing positive polarity rectangular wave currents. Similarly, a second bank of commutating capacitors is provided between the intersections of each SCR and diode in the lower inverter section for producing negative polarity rectangular wave currents. As is known in the art, a conducting SCR is turned off by supplying a gating pulse to the next SCR in sequence by means of the parallel capacitor commutation mechanism, the blocking diode in series with the SCR being commutated serving to isolate the commutating capacitor from the load. The currents are not sinusoidal, but rather are rectangular and ideally flow for only 120° of each half cycle (neglecting commutation). Since the per phase rectangular wave stator line currents are 120° displaced from one another, at any moment two stator windings 14s are conducting while the remaining phase is open circuited. As compared to conventional voltage control systems, the current controlled inverter illustrated has the advantages of a reduction in power circuitry, simplified commutation circuitry, and requires less expensive rectifier-grade thyristors. The constant current source converter has the capability for power flow in both directions, to transfer power from the three-phase ac input to the motor in the motoring mode, and to return power to the supply in the generating mode of the induction motor. During reverse power flow, the polarity of current flow through smoothing inductor 11 and inverter 12 is the same, however the polarity of the dc output voltage of bridge rectifier 100 is negative, and the input voltage to inverter 12 is also negative.

Figure 4:
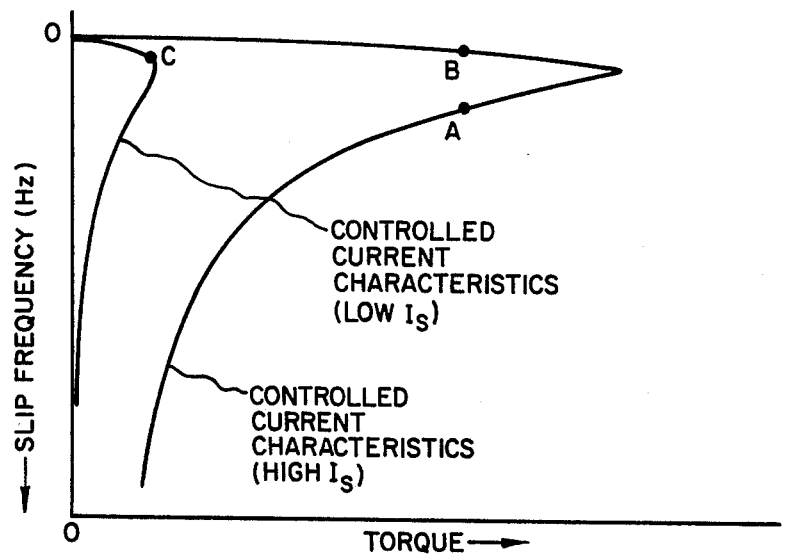
FIG. 4 shows the first quadrant of typical slip-torque controlled current characteristics for two values of stator current.

FIG. 4 shows two typical first quadrant steady-state characteristics for controlled current operation of an induction motor, the left-hand characteristic applying to a lower value of stator current $I_s$, while the right-hand characteristic applies to a higher value of $I_s$. An objective of the present motor control circuit is to achieve improved stable four-quadrant operation, that is, in order, forward motoring, forward regeneration, reverse motoring, and reverse regeneration. Examination of the slip frequency-torque characteristics indicates two regions of operation, one with a positive slope and the other with a negative slope. The positive slope portions are well known to be inherently unstable, inasmuch as higher values of torque call for lower values of slip frequency, an unstable situation. This type of instability is referred to as a static instability. It is also possible to have a dynamic instability on either portion of the characteristics. This is caused by negative electrical damping which is highly dependent on the selection of operating point and machine parameters. For current controlled inverter operation, the steady-state operating point can occur on either the upper or lower portion of the characteristic. For example, if operation is constrained such that rated flux in the air gap between stator and rotor always occurs, operation is then at point A for rated output torque. Operation at point B, which yields the same output torque, corresponds to a highly saturated condition. For low torque and rated flux conditions, the steady-state operating point would be on the upper portion of a low current magnitude characteristic, for example, at point C. Point C is on the statistically stable side of the lower stator current characteristic. It is apparent that closed loop operation is necessary to insure stable operation over the entire load range of current controlled inverter drives. Of course, motor performance is optimized by operating at point A rather than point B on the high current magnitude characteristic under conditions of rated air gap magnetic flux.

To obtain improved stable four-quadrant operation of a controlled current induction motor as herein described for stable, steady-state performance as well as transient performance, the concurrent use of a plurality of feedback control loops is required. During normal steady-state operation, where the performance is also optimized by maintaining the air gap magnetic flux at its rated value. In particular, one feedback control means constrains the motor excitation electrical frequency to be the sum of slip frequency and sensed rotor frequency. In the motor control itself, this is implemented by controlling the inverter operating frequency and thus the frequency of the stator line currents generated by the constant current source converter. Another feedback control means constrains the slip frequency as a predetermined function of sensed stator line current to maintain constant rated air gap magnetic flux. Also, a third feedback control means is provided to constrain the stator line current amplitude to a command value by regulating the rectifier output voltage. For those systems where rotor speed rather than stator current or torque is the unconstrained input, an additional external feedback control means is used to null the difference between command values of rotor speed and actual values of rotor speed. The speed control loop forces the system to maintain constant mechanical speed independent of current excitation or load. For either system, whether the unconstrained input is rotor speed or desired torque, a motoring-generating control determines the sign of the slip frequency. A suitable slip frequency regulator, rectifier voltage regulator, and speed regulator are included in the respective feedback control loops as will be described.

To constrain the motor excitation electrical frequency to be the sum of slip and rotor frequency, a rotor frequency sensor signal $\omega_r$ is derived from the output of tachometer 15 as previously explained (see FIG. 1), and a slip frequency signal $\omega_{slip}$ and the rotor frequency sensor signal $\omega_r$ are applied to a summing circuit 20 to generate the electrical frequency control signal $\omega_e$. Electrical frequency control signal $\omega_e$ is used to determine the operating frequency of current controlled inverter 12 by controlling the frequency of gating pulses applied in the proper sequence to the gates of thyristors 16. Hence, the frequency of the stator currents $I_s$ and the motor excitation electrical frequency are essentially determined by the magnitude of $\omega_e$. Inverter control circuits of this type are known in the art. With this type of control, changes in slip frequency become an unconstrained input. The control forces electrical frequency to change in response to rotor speed which tends to force a constant angular displacement between rotor and stator magnetomotive forces during both steady-state and transient conditions.

Figure 5:
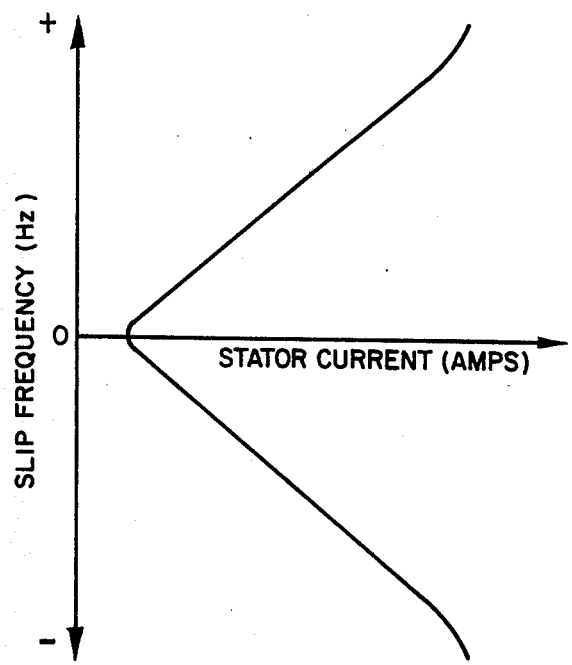
FIG. 5 is a slip-stator current characteristic for the slip frequency regulator in the feedback control loop controlling slip as a function of stator current to maintain a constant predetermined air gap magnetic flux.
Figure 6:
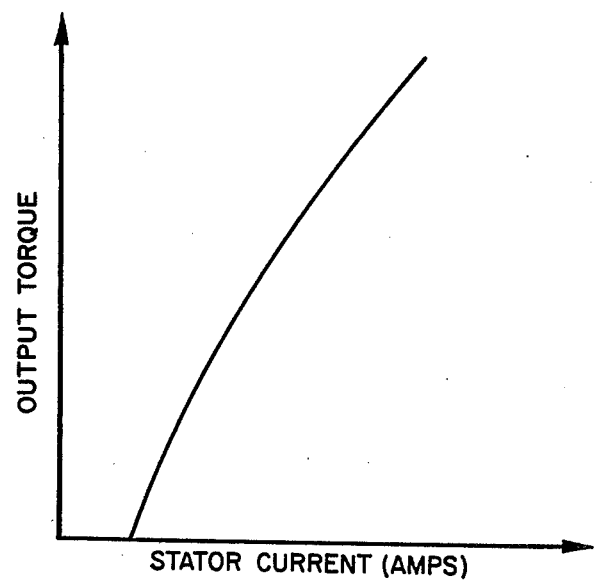
FIG. 6 shows the resulting desired approximately linear torque-stator current characteristic.

An absolute magnitude slip frequency signal is generated by a slip regulator or function generator as a predetermined function of a stator current sensor signal to maintain constant rated air gap magnetic flux. This closed loop control forces the slip frequency to respond to current magnitude changes in order to maintain constant flux during both steady-state and transient stability conditions. An appropriate current sensing means such as current transformer 21 senses the peak amplitude of the fundamental component of stator line current and generates a stator current sensor signal representative thereof. Instead of sensing the amplitude of the rectangular wave stator currents, for a three-phase circuit usually performed by sensing the three per phase stator currents and averaging, an alternative technique is to sense the equivalent input inverter current. Except for internal inverter losses, the magnitude of the inverter input current is equal to the magnitude of the rectangular wave output currents in a current controlled inverter of this type. A slip frequency regulator or function generator 22 is actuated by the stator current sensor signal and produces the absolute value slip frequency signal $\omega_{slip}$ by varying slip as a function of stator current according to the slip frequency-stator current characteristic in FIG. 5. This type of control results in the desirable characteristic of torque being approximately linearly related to current, with the exception of low values of shaft torque, as shown in FIG. 6. It is noted that this constraint effectively removes slip frequency as a system input. As will be further explained, a motoring-generating control 23 inverts the polarity of the absolute magnitude slip frequency signal only when the motor is generating, so that the slip frequency signal $\omega_{slip}$ is positive for motoring and negative for generating.

To obtain the desired steady-state characteristics and to improve system transient response, rectifier voltage is also controlled to null the difference between a commanded value and the actual sensed value of stator current or, more acurately, armature current. In this feedback control loop, a stator current amplitude command signal $I'_s$ representative of the desired torque and the stator current amplitude sensor signal derived by current transformer 21 are summed in another summing circuit 24 to generate a current amplitude error signal which actuates a properly selected rectifier voltage regulator 25. An integral plus proportional controller is used to give a satisfactory speed of response with zero steady-state error. The voltage regulator produces at its output a voltage control signal for determining the magnitude and polarity of the unidirectional output voltage of controlled rectifier 25, in particular by generating phase control signals that determine the firing angles for the rectifier thyristors. During regeneration or at any time when the sensed stator current amplitude is higher than the commanded value, power flow through the constant current source converter may be in the reverse direction since the error signal has the opposite polarity.

In the external rotor speed feedback control loop, the rotor speed sensor signal generated by tachometer 15 is summed with a rotor speed command signal $\omega_r'$ in a third summing circuit 26 to generate a rotor speed error signal. The speed command signal $\omega_r'$ is the unconstrained input and can, for example, be set manually by means of a potentiometer 27 with the wiper position determining the magnitude of rotor speed. The rotor speed error signal actuates a speed regulator 28 for producing the previously mentioned stator current command signal $I'_s$. The use of a simple proportional speed controller results in a response which has nearly zero error, however an absolute value type controller must be used to command a positive value of current greater than magnetizing current wherever there is a finite speed error. The rotor speed error signal can be positive or negative at any time as the motor speeds up or slows down relative to the command value, and is usually negative during regenerative operation. As the magnitude of the rotor speed error signal increases, the absolute value type proportional speed regulator increases in similar fashion the magnitude of the stator current amplitude command signal. Because of the speed control loop, the system is forced to maintain constant mechanical speed independent of current excitation or load.

The controlled current induction motor drive with all control loops as shown in FIG. 1 is inherently capable of regeneration. A negative rotor speed error signal forces regeneration by changing the polarity of the slip frequency. As was previously mentioned, the rotor speed error signal is an input to the motoring-generating control 23, inverting the polarity of the absolute value slip frequency signal during regenerative operation. As will be evident to those skilled in the art, motoring-generating control 23, slip frequency regulator 22, rectifier voltage regulator 25, and speed regulator 28 can be implemented using operational amplifier circuits, or other implementations already known in the prior art can be used.

The operation of the controlled current induction motor drive system in FIG. 2 having torque or stator current amplitude as the unconstrained input is obvious from the prior discussion. For use in a traction application, for example, the desired torque value can be obtained at the wiper of a manually settable potentiometer 29. Motoring-generating control 23 also can take the form illustrated utilizing a two-position switch 30 which is manually movable between a motor position and a brake position. In the motor position, the slip frequency signal $\omega_{slip}$ has a positive polarity, while in the brake position, the absolute value signal is fed through an inverter 31 to produce a negative polarity slip frequency signal. Forced regenerative operation is then obtained.

In summary, the use of several feedback control loops concurrently as has been described results in an improved, more stable controlled current induction motor drive with capability for four-quadrant operation under optimized conditions at constant rated flux. When stator current amplitude and rotor speed are used as feedback variables, the controlled current system is found to be stable and very well damped over the entire speed-torque range. For a further discussion of the invention and its theoretical basis, reference may be made to the publication by the inventors entitled "Design of Controlled Current AC Drive Systems Using Transfer Function Techniques," Proceedings of the International Federation of Automatic Control Conference on "Control in Power Electronics and Electrical Drives," pp. 133–147, held at Dusseldorf, West Germany, Oct. 7–9, 1974.

While the invention has been particularly shown and described with reference to several preferred embodiments thereof, it will be understood by those skilled in the art that various changes in form and details may be made therein without departing from the spirit and scope of the invention.

The invention claimed is:

1. A motor control circuit for a current controlled induction motor having a stator winding on a stator which is separated from a rotor by an air gap comprising a constant current source converter for producing variable amplitude and frequency stator line current to be supplied to the stator winding, current sensing means for sensing the peak stator current amplitude and speed sensing means for effectively sensing the speed and frequency of said rotor and generating sensor signals respectively representative thereof, first feedback control means for deriving a slip frequency signal as a predetermined function of said stator current sensor signal to maintain constant rated air gap magnetic flux, second feedback control means for summing said slip frequency and rotor frequency sensor signals to generate an electrical frequency control signal which is fed to said converter to determine the frequency of the stator line current produced by said converter, and third feedback control means for summing a stator current amplitude command signal representative of desired torque and said stator current sensor signal to generate an error signal which is fed to said converter to determine the amplitude of the stator line current produced by said converter.

2. A motor control according to claim 1 wherein said first feedback control means is comprised by a slip frequency regulator actuated by said stator current sensor signal and producing an absolute magnitude slip frequency signal, and a motoring-generating control for inverting said absolute magnitude slip frequency signal only when said motor is generating to thereby derive said slip frequency signal.

3. A motor control according to claim 1 further including fourth feedback control means for summing a rotor speed command signal and said rotor speed sensor signal to generate a rotor speed error signal used in turn to derive said stator current amplitude command signal.

4. A motor control according to claim 3 wherein said fourth feedback control means further includes an absolute value type proportional speed regulator actuated by said rotor speed error signal and producing said stator current amplitude command signal.

5. A motor control according to claim 4 wherein said first feedback control means is comprises by a slip frequency regulator actuated by said stator current sensor signal and producing an absolute magnitude slip frequency signal, and a motoring-generating control for receiving said absolute value slip frequency signal and deriving the aforementioned slip frequency signal with a polarity determined by the polarity of said rotor speed error signal.

6. A motor control circuit for stable four-quadrant operation of a current controlled induction motor having a stator which is separated from a rotor by an air gap comprising a constant current source converter comprising a controlled rectifier and variable operating frequency current controlled inverter with a smoothing inductor therebetween for producing variable amplitude and frequency rectangular wave stator line current to be supplied to the stator winding, current sensing means for sensing the peak stator current amplitude and speed sensing means for effectively sensing the speed and frequency of said rotor and generating sensor signals respectively representative thereof, first feedback control means for deriving a slip frequency signal as a predetermined function of said stator current sensor signal to maintain constant rated air gap magnetic flux, second feedback control means for summing said slip frequency and rotor frequency sensor signals to generate an electrical frequency control signal which is fed to said current controlled inverter to determine the operating frequency thereof, and third feedback control means for summing a stator current amplitude command signal representative of desired torque and said stator current sensor signal to generate an error signal which determines the unidirectional output voltage of said controlled rectifier and thus the magnitude of the direct current fed to said current controlled inverter.

7. A motor control circuit according to claim 6 wherein said first feedback control means is comprised by a slip frequency regulator actuated by said stator current sensor signal and producing an absolute value slip frequency signal, and a motoring-generating control for inverting said absolute magnitude slip frequency signal only when said motor is generating to thereby produce said slip frequency signal with a positive polarity during motoring and a negative polarity during generating.

8. A motor control according to claim 6 further including fourth feedback control means for summing a rotor speed command signal and said rotor speed sensor signal to generate a rotor speed error signal used in turn to derive said stator current amplitude command signal.

9. A motor control according to claim 8 wherein said fourth feedback control means further includes an absolute value type proportional speed regulator actuated by said rotor speed error signal and producing said stator current amplitude command signal.

10. A motor control according to claim 9 wherein said first feedback control means is comprised by a slip frequency regulator actuated by said stator current sensor signal and producing an absolute magnitude slip frequency signal, and a motoring-generating control for receiving said absolute value slip frequency signal and deriving the aforementioned slip frequency signal with a polarity determined by the polarity of said rotor speed error signal.

11. A motor control according to claim 10 wherein said third feedback control means includes an integral plus proportional type voltage regulator actuated by said first-mentioned stator current error signal and producing a voltage control signal for determining the magnitude of the unidirectional output voltage of said controlled rectifier.

* * * * *